United States Patent [19]
Yamazaki et al.

[11] 3,799,531
[45] Mar. 26, 1974

[54] BUFFERING DEVICE

[75] Inventors: Harumichi Yamazaki, Tokyo; Kihei Nakamura, Yokohama; Yoshikazu Kondo, Tokyo, all of Japan

[73] Assignee: Bridgestone Fire Company Limited, Tokyo, Japan

[22] Filed: July 18, 1972

[21] Appl. No.: 272,877

[30] Foreign Application Priority Data
Sept. 8, 1971 Japan.............................. 46-68852

[52] U.S. Cl. .............................................. 267/140
[51] Int. Cl............................................ F16f 7/08
[58] Field of Search ........... 269/141, 139, 140, 152, 269/153, 63

[56] References Cited
UNITED STATES PATENTS
3,202,412  8/1965  Trask................................ 267/153
3,285,594  11/1966  La Belle.............................. 267/141
3,480,268  11/1969  Fishbaugh........................... 267/141
3,258,134  6/1966  Nicolas................................ 267/141

Primary Examiner—James B. Marbert
Attorney, Agent, or Firm—Fleit, Gipple & Jacobson

[57] ABSTRACT

A buffering device comprising a resilient buffer member, a resilient friction member abutting the buffer member at one end thereof, the resilient friction member being expansible in a direction perpendicular to compressive forces applied in use thereto. The restrictor restricting expansion of the friction member and an impact-receiving member is adapted, to receive an external impact load and to transmit the impact load to the resilient member through the friction member while causing the friction member to move against friction between the friction member and the restrictor.

9 Claims, 5 Drawing Figures

BUFFERING DEVICE

BACKGROUND OF THE INVENTION

1. Field of the Invention:

This invention relates to a buffering device which is capable of absorbing a large amount of impact energy.

2. Description of the Prior Art:

Generally speaking, conventional buffering devices for absorbing impact load or energy, which may be made of resilient rubber material or metallic springs, have a shortcoming in that they are bulky.

Therefore, an object of the present invention is to provide an improved buffering device which is small yet capable of absorbing a large amount of impact energy.

SUMMARY OF THE INVENTION

According to the present invention, there is provided a buffering device comprising a resilient buffer member, a resilient friction member abutting said buffer member at one end thereof, said friction member being expansible in a direction perpendicular to compressive forces applied in use thereto, a restrictor restricting expansion of said friction member and impact-receiving member adapted, in use to receive an external impact load and to transmit the impact load to said resilient buffer member through said friction member while causing the friction member to move against friction between the friction member and said restrictor.

BRIEF DESCRIPTION OF THE DRAWING

Embodiments of the present invention will now be described, by way of example, with reference to the accompanying drawings, in which.

Like parts are designated by like numerals throughout the different figures of the drawings.

DESCRIPTION OF THE PREFERRED EMBODIMENTS

Figure 1:
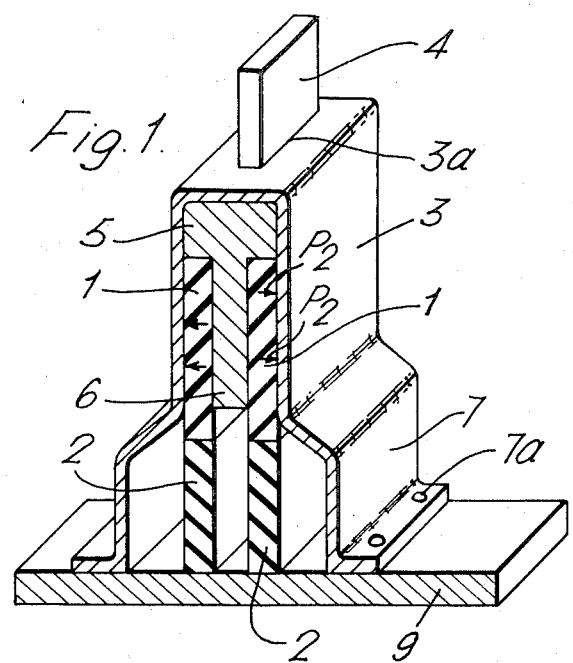
FIG. 1 is a schematic perspective view of a buffering device according to the present invention.

Referring to FIG. 1, the buffering device includes a resilient friction member 1 which consists of a pair of parallel plate sections. The friction member 1 is secured to the upper end of a resilient buffer member 2, for instance, by applying a suitable adhesive therebetween. The resilient friction member 1 and the resilient buffer member 2 are housed in a casing 3, which has an internal surface frictionally engaging the peripheral surface of the resilient friction member 1. The walls of the casing 3 act to restrict deformation of the resilient friction member 1 when an impact load is applied thereto. In the embodiment of FIG. 1, an opening 3a is formed in the top wall of the casing 3 and an impact-receiving member 4 slidably fits in the opening 3a. The impact-receiving member 4 has a flange 5 connected thereto which operatively engages the resilient friction member 1 at an end thereof opposite to the aforesaid resilient buffer member 2. A core member 6 extends from the flange 5 into a space between the two plate sections of the resilient friction member 1, as shown in FIG. 1. The core member 6 cooperates with the internal surface of the casing 3 in defining a restrictor which restricts deformation of the resilient friction member 1. The casing 3 has foot portions 7 which are secured to a base plate 9, and the resilient buffer member 2 is directly attached to the base plate 9.

In operation of the buffering device of FIG. 1 the casing 3 is fixed to the base plate 9, for instance, by bolts extending through holes 7a bored through foot portions 7 of the casing.

In use, the casing 3 is so orientated that the impact-receiving member 4 acts to receive an impact load substantially at right angles to the base plate 9. The impact load is transmitted to the resilient friction member 1 via the flange 5 so that the resilient friction member 1 is compressed in the direction of the impact load and the member 1 tends to expand in a direction perpendicular to the compression, as shown by the arrows $P_2$ of FIG. 1. The restrictor consisting of the casing 3 and the core 6, however, acts to restrict the expansion of the member 1 beyond a certain limit. As a result, a large frictional resistance is generated against longitudinal displacement of the member 1 relative to the casing 3.

The elasticity of the resilient friction member 1 is so related to the elasticity of the resilient buffer member 2 that the aforesaid expansion of the resilient friction member 1 occurs before resilient deformation of the buffer member takes place as a result of the application of the impact load to the buffering device. Thus, a high frictional resistance to deformation or displacement of the friction member 1 relative to the casing 3 is established. As a result, the impact energy applied to the buffering device is absorbed both by the elastic deformation of the resilient buffer member 2 and the friction loss between the resilient friction member 1 and the restrictor constituted by the casing 3 and the core 6. Accordingly, a high impact energy absorbing capacity is obtained with a compact structure.

Figure 2:
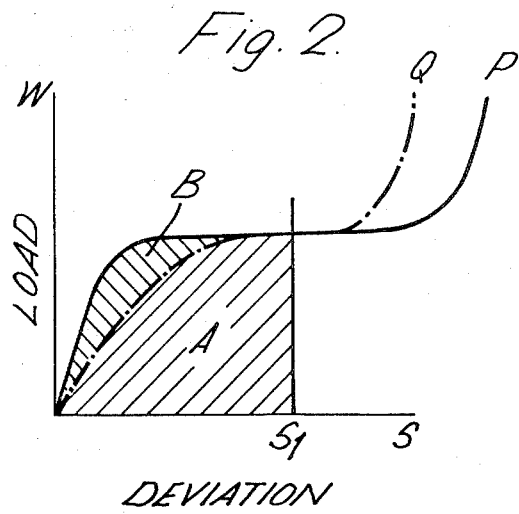
FIG. 2 is a graph, illustrating the load-deformation or load-deviation characteristics of the buffering device of FIG. 1.

FIG. 2 illustrates the load-deformation or load-deviation characteristics of impact absorbing devices.

In the figure, the dash-dot line curve Q represents the load-deformation characteristics of a conventional resilient rubber member (for instance, a hollow tubular rubber member), while the solid line curve P represents the load-deformation characteristics of the buffering device using a hollow, tubular buffer member 2 made of rubber. In FIG. 2, the abscissa represents the deformation or displacement S, while the ordinate represents the load W applied thereto. It is known that, with the load-deformation curve of FIG. 2, the area between the characteristic curve and the abscissa for a deformation range of zero to $S_1$ represents the amount of energy absorbed by the buffering device with the particular load-deformation curve for that deformation range. For instance, the hatched area A of FIG. 2 under the dash-dot line curve Q represents the amount of energy absorbed by the conventional impact absorbing device when it is deformed from zero to $S_1$. The amount of energy which is absorbed by the buffering device of the present invention with the load-deformation curve P for a deformation range zero to $S_1$ is greater than the aforesaid area A by an area B, as shown in FIG. 2. Such an increase in energy absorption according to the present invention is due to the fact that the friction between the friction member 1 and the restrictor increases the reactive force of the buffering device for a given deformation S within a certain range, as shown in the figure. As will be apparent from FIG. 2, for a given amount of impact energy to be absorbed, a buffering device according to the present invention can be made more compact than a conventional buffering device.

Figure 3:
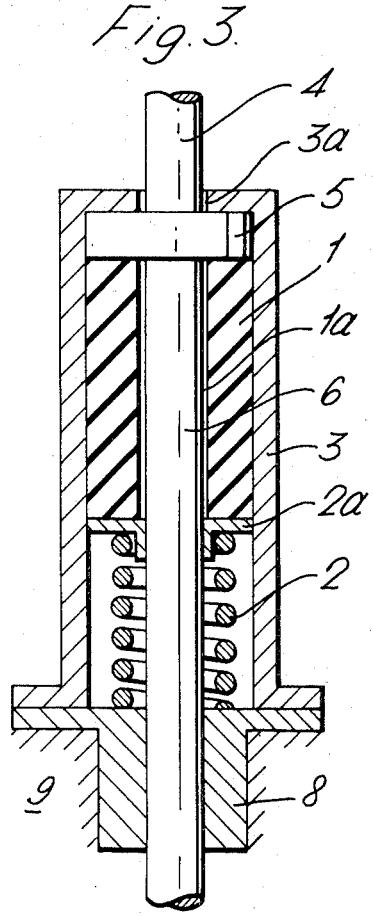
FIGS. 3 to 5 are schematic sectional views, illustrating three different embodiments of the invention.

Referring now to FIG. 3, the buffering device includes resilient friction member 1 in the form of a hollow tubular rubber body. The friction member 1 is supported by resilient buffer member 2 consisting of a coil spring via a seat member 2a which is a spring seat, in this embodiment. The tubular friction member 1 and the resilient buffer member 2 are housed in cylindrical casing 3 as in the embodiment of FIG. 1. Core 6 is fitted in a central hollow space 1a of the friction member 1, so as to form, together with the casing 3, a restrictor which restricts radial expansion of the member 1 in its radial direction, i.e., perpendicular to the direction of application of the impact load. An impact-receiving member 4, which is connected to the core member 6 through flange 5, extends to the outside of the casing 3 through an opening 3a, as shown in FIG. 3. In the embodiment of FIG. 3, the end of the core member 6 opposite to the flange 5 extends into base plate 9 through a guide member 8 secured to the base plate 9.

In operation of the buffering device of FIG. 3, upon application of an impact load to the impact-receiving member 4, the impact load is transmitted to the resilient friction member 1 through the flange 5. The elasticity of the spring of the buffer member 2 is such that the member 1 tends to expand radially before the spring of the buffer member 2 actually begins to be compressed. Such a tendency of the friction member 1 to expand radially causes a high frictional resistance against the movement of the member 1 relative to the casing 3, because the casing 3 and the core 6 act to restrict the member 1 from further deformation. As a result, a high energy absorption is ensured by the combination of the resiliency of the buffer member 2 and the friction loss between the friction member 1 and the casing 3.

Figure 4:
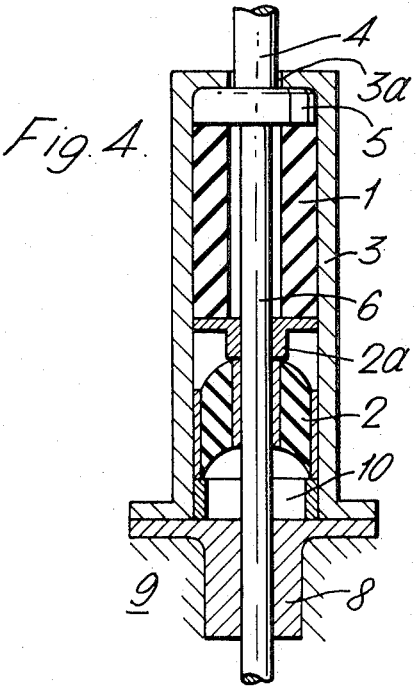

Referring now to FIG. 4, the buffering device is substantially the same as the buffering device of FIG. 3 except that buffer member 2 consists of a shear-type rubber cylinder instead of the coil spring of FIG. 3. In the device of FIG. 4, one end of the shear-type rubber cylinder of the buffer member 2 operatively engages a seat member 2a, which is inserted between the buffer member 2 and a resilient friction member 1. The friction member 1 of FIG. 4 is substantially identical to the friction member 1 of FIG. 3. The friction member 1 and the shear-type buffer member 2 are housed in casing 3. Core member 6 aligned with an impact-receiving member 4 extends through the central hollow space of the friction member 1 so as to form, with the casing 3, a restrictor which restricts radial expansion of the member 1. An end ring 10 is inserted between guide member 8 and the end of the shear-type buffer member 2 opposite to the seat 2a, guide member 8 serving to guide the movement of the core member 6. The initial bias to be applied to the shear-type buffer member 2 towards the friction member 1 can be controlled by appropriate selection of the size of the end ring 10, as can be seen from FIG. 4. The device of FIG. 4 responds to impact load applied thereto in a manner similar to that of FIG. 3 so as to absorb the impact energy by the combination of the resilient deformation of the buffer member 2 and the friction loss between the friction member 1 and the casing 3.

Figure 5:
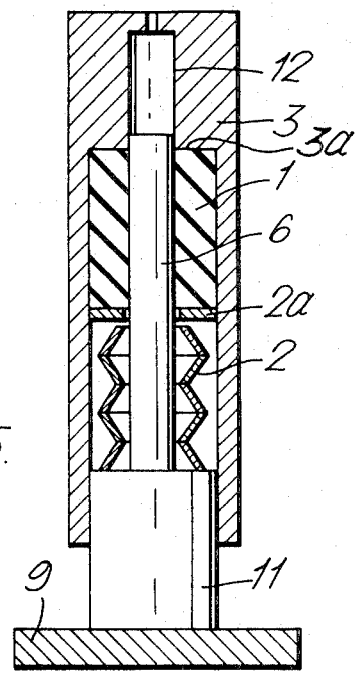

Referring now to FIG. 5, the buffering device illustrated therein includes casing 3 which houses resilient friction member 1 and resilient buffer member 2 which, in this embodiment, consists of a number of disc-shaped springs which are aligned with the longitudinal axis of the core member 6. The casing 3 is axially movable relative to the core member 6 and slidably engages a guide stud 11 which carries the core member 6 and is integral with base plate 9. A guide bore 12 is formed in the upper end portion of the housing 3, and is slidable over the core member 6. The guide bore 12 is long enough to ensure smooth movement of the casing 3 relative to the core 6 upon application of an impact load on the casing 3. Resilient friction member 1, which is substantially identical with friction members 1 of FIGS. 1, 3 and 4 is disposed between the core 6 and the casing 3, and resilient buffer member 2 operatively engages the lower end of the friction member 1 through seat member 2a. As in the device of FIG. 4, the casing 3 and the core 6 define a restrictor limiting the radial expansion of the friction member 1. The housing 3 has a shoulder 3a formed on its inner surface around the guide bore 12, so that an impact load applied to the casing 3 is transmitted to the resilient friction member 1 through the shoulder 3a.

In operation of the buffering device of FIG. 5, an impact load applied to the casing 3 is transmitted to and absorbed by a combination of the resilient deformation of the buffer member 2 and friction loss between the core 6 and the casing 3, in a manner similar to that described with reference to FIGS. 1, 3 and 4.

To improve the energy absorbing ability of the buffering device, the friction between the friction member 1 and the coacting stationary surface of the restrictor, which surface may be that of the core 6 or the casing 3, can be increased by roughening the friction surfaces. Suitable serrations may be formed on one or both of the friction surfaces for the same purposes. In the illustrated embodiments, buffer members are disclosed which consist of rubber plates, a coil spring, a shear-type rubber cylinder, or disc-shaped springs. Instead of such buffer members any other suitable impact absorbing buffer members may be used for instance, a hollow tubular rubber member or leaf springs.

When a hollow tubular rubber cylinder or rubber plates are used to constitute a resilient buffer member 2, such buffer member 2 may be formed as a part of the resilient friction member 1 simply by extending the latter.

It should be noted that the friction loss by the friction member 1 is caused even before the friction member 1 expands to fill the entire space between the casing 3 and the core member 6. More particularly, upon application of a compressive force to the friction member 1, at least a part of the member 1 extends and, as soon as the opposing surfaces of the friction member 1 partially come into frictional contact with, or form a few contact points with, the coacting surfaces, the friction member 1 acts to absorb impact energy by the friction loss generated at the frictional contact.

The above described buffering devices efficiently absorb impact energy by a combination of resilient deformation and friction loss.

What is claimed is:

1. A buffering device comprising a support member;

a hollow elongated resilient buffer member having one longitudinal end fixed to said support member;

a hollow elongated resilient friction member having one longitudinal end adjacent the opposite longitudinal end of said buffer member, the hollow space of said friction member being linearly aligned with the hollow space of said resilient buffer member;

a restrictor comprising a casing which surrounds the outer surfaces of said buffer member and said friction member, and a core member slidably extending through at least the hollow space of said friction member, said restrictor being in contact with the outer periphery of said friction member so as to restrict expansion of said friction member in directions perpendicular to the direction of elongation thereof when said friction member is compressed in said direction of elongation, one of the casing and the core member being secured to said support member;

and an impact-receiving member having a part engaging the opposite longitudinal end of said friction member, said impact-receiving member being secured to that one of said casing and said core member which is not connected to said support member, so that, upon impact, said friction member is expanded in said perpendicular directions until said friction member engages both said core member and said casing so as to move against friction between the friction member and said restrictor.

2. A buffering device according to claim 1, wherein said friction member comprises a pair of parallel rubber plates, and said resilient buffer member comprises another pair of rubber plates which are respectively aligned with and connected to said rubber plates of the friction member, with the rubber plates of the friction member being more resiliently deformable than those of said resilient buffer member.

3. A buffering device according to claim 1, wherein said friction member comprises a hollow rubber tube through which the core member extends, and said resilient buffer member comprises a coil spring supporting said rubber tube at one end thereof.

4. A buffering device according to claim 1, wherein said friction member is a hollow rubber tube through which the core member extends, and the resilient buffer member is a shear-type rubber cylinder.

5. A buffering device according to claim 4, including a ring adapted to bias said resilient buffer member towards said friction member.

6. A buffering device according to claim 1, wherein said friction member is a hollow rubber tube through which said core member extends, and said resilient buffer member comprises a plurality of disc-shaped springs in alignment with the longitudinal axis of the core member.

7. A buffering device according to claim 6, wherein said core member extends into said tube casing and through said plurality of disc-shaped springs.

8. A buffering device according to claim 7, wherein said tube casing has a guide bore adapted to slidably receive said core member.

9. A buffering device according to claim 8, including a guide stud which carries said buffer member and said core member in alignment with the longitudinal axis thereof, with said casing being adapted to be slidably received over said stud for guiding the movement of the casing.

* * * * *